United States Patent
Yu et al.

(10) Patent No.: US 11,861,173 B2
(45) Date of Patent: Jan. 2, 2024

(54) STORAGE DEVICE HAVING A DRIVE ARM WITH MULTIPLE READ-WRITE HEAD

(71) Applicant: Felicity Taiwan Corporation, Taipei (TW)

(72) Inventors: Wen-Lang Yu, Taipei (TW); Chia-Chien Yu, Taipei (TW)

(73) Assignee: Felicity Taiwan Corporation, Taipei (TW)

(*) Notice: Subject to any disclaimer, the term of this patent is extended or adjusted under 35 U.S.C. 154(b) by 13 days.

(21) Appl. No.: 17/216,710

(22) Filed: Mar. 30, 2021

(65) Prior Publication Data
US 2022/0317885 A1 Oct. 6, 2022

(51) Int. Cl.
*G06F 3/06* (2006.01)
*G11B 5/49* (2006.01)

(52) U.S. Cl.
CPC .......... *G06F 3/0611* (2013.01); *G06F 3/0676* (2013.01); *G11B 5/4976* (2013.01)

(58) Field of Classification Search
CPC .... G11B 5/4976; G11B 5/4915; G06F 3/0611
See application file for complete search history.

(56) References Cited

U.S. PATENT DOCUMENTS

| | | | | |
|---|---|---|---|---|
| 5,440,437 A | * | 8/1995 | Sanada | G11B 5/5565 360/97.12 |
| 6,121,742 A | * | 9/2000 | Misso | G11B 5/553 |
| 2005/0283653 A1 | * | 12/2005 | Noguchi | G11B 5/4976 |
| 2010/0091408 A1 | * | 4/2010 | Albrecht | G11B 17/021 360/110 |
| 2016/0132393 A1 | * | 5/2016 | Bendigeri | G06F 3/0619 714/766 |
| 2020/0020357 A1 | * | 1/2020 | Dunn | G11B 5/5569 |
| 2020/0202891 A1 | * | 6/2020 | Mendonsa | G11B 17/038 |
| 2021/0312945 A1 | * | 10/2021 | Mendonsa | G11B 5/016 |

* cited by examiner

*Primary Examiner* — Baboucarr Faal
(74) *Attorney, Agent, or Firm* — Min-Lee Teng

(57) ABSTRACT

A hard disk drive having a single drive arm with multiple read-write heads for synchronous access to data, wherein the multiple read-write heads are used for synchronous access to shorten the access time of the hard disk drive and the data.

11 Claims, 6 Drawing Sheets

STORAGE DEVICE HAVING A DRIVE ARM WITH MULTIPLE READ-WRITE HEAD

BACKGROUND OF THE INVENTION

Field of the Invention

The present invention relates to a hard disk, and in particular to a hard disk with a drive arm having multiple read-write heads.

Description of the Prior Art

For a traditional personal computer, the hard disk drive (HDD) is used as the loading device of the operating system (OS), and it uses a non-volatile storage device based on hard rotating discs to store and retrieve data on a flat magnetic surface. data is written to the hard disk through the magnetic head close to the magnetic surface such that the polarity is changed by electromagnetic currents. data can be read back in the opposite way, such as a magnetic field causing a change in power of a coil or a head passing over the hard disk.

Those who familiar with hard disk drives know that the total capacity of a hard disk drive is multiplied by several factors, including the total number of hard disks (Platter) and the total number of read-write heads (R/W-Head), the total number of tracks, the total number of sectors for each track, and the storage capacity of each sector.

In the DOS era, because the CPU speed is not fast enough, the hard disk drive speed is also very slow, in order to improve performance, speeding up file access speed is one of the keys, the method is to use clusters, regardless of file size, the unit of file storage, they are all based on clusters, even if the file has only a few bytes (Bytes) stored, it still occupies one cluster. A cluster can consist of one or several consecutive sectors. The formula is: cluster=sectors×N, where N is the exponent of 2.

Therefore, a cluster can be composed of 1, 2, 4, 8, 16, 32 or more sectors. When the cluster comprises more sectors, it means that the total number of files on the hard drive will be smaller. It also means that the access speed will be faster. Generally, a cluster is designed to be equal to 8 sectors and one sector is 512 Byte, in other words, a cluster is 4 KB. For the convenience of explaining this case, here we define 1 cluster equal to 4 sectors. Today's hard disk drive manufacturers no longer provide the above-mentioned internal parameters of the hard drive, and the capacity of a 2.5-inch single hard disk can reach more than 1 TB, according to the formula: total capacity=2 (sides of a hard disk)×number of tracks×number of sectors per track×capacity per sector=2× 65,536×16,384×512=1,099,511,627,776. We can estimate that the possible composition of the above parameters is: 2 read-write heads, each side has 65,536 tracks, each track has 16,384 sectors, and each sectors has 512 bytes (Byte), which means the data storage density of hard disks with the same unit region today is more than that of 40 years ago by at least 10,000 times.

File Allocation Table (FAT, File Allocation Table) is a file management system invented and partially patented by Microsoft. It has evolved from the original FAT12 (1980) to FAT16 (1987) and FAT32 (1996). FAT64 (2006), NTFS (1993, Windows NT), etc., these types of FAT have different specifications for the cluster size. Later, there are newcomers who use permanent memory instead of hard disk drives. This kind of computer external storage device based on permanent memory, such as flash memory, is called solid-state disk (SSD). Solid-state hard drives are generally made in the same shape as conventional hard drives, such as the common 1.8-inch, 2.5-inch or 3.5-inch specifications, and use mutually compatible data transmission interfaces such as SATA, which are used to replace the aforementioned standard size hard drive in computers. Although there is no rotatable disk-shaped disk structure in solid-state hard disks, according to naming conventions, this type of storage device is still called "hard disk."

Due to the difference between the hard drives and solid-state drives in terms of innate technology and physical structure, the biggest disadvantage of the hard drives is that the data transfer rate is too slow and the access time of the read-write head is too long.

In 2018, Seagate, one of the hard disk drive manufacturers, launched a dual drive arm hard drive (MACH.2). As the name suggests, the hard drive uses a dual drive arm structure to speed up data access time. The test report shows that the dual-drive shaft hard disk drive has a 60% performance increase compared to the general hard disk drive. Even so, the performance is still difficult to compete with the solid-state drive. At the same time, compared with this case, this case is the same as the general hard disk drive with one drive arm. Therefore, this case is different from the dual-drive arm hard disk drive (MACH.2). Take the hard drive.

Therefore, a better solution is needed to solve the aforementioned problems.

SUMMARY OF THE INVENTION

The present invention discloses a single drive arm with multiple read-write heads that are capable of accessing data synchronously. As the name implies, a drive arm drives multiple read-write heads that write data to the hard disk (Platter) or read from the hard disk simultaneously. Because there can be 2, 4, 6, 8 or 12 read-write heads to access data simultaneous, the speed of data transfer of the present invention can be 2, 4, 6, 8 or 12 times faster than that of a traditional hard disk drive, and a single hard disk at four times the speed will be described in this embodiment of the present invention.

One embodiment of the present invention provides a storage device comprising a drive arm having at least two of read-write heads capable of accessing data synchronously, the storage device comprising: at least one hard disk, wherein each hard disk is divided into at least two regions; a drive arm, having at least two read-write heads, wherein each read-write head reads and writes data in a corresponding region of the at least two regions; and a control unit, separating first data to be written into a plurality of write-data, wherein each write-data corresponds to a different read-write head of the at least two read-write heads for writing said first data synchronously.

In one embodiment, the storage device has an interface unit, wherein the interface unit is one of the following: Parallel ATA series, Serial ATA series, SCSI series, USB series, SAS series and PCIe series.

In one embodiment, the storage device has a processing unit for reading/writing data, wherein the processing unit comprises at least one of the following: a data buffer, a CRC generator, error data detection and calibrator, series/parallel data converter and a comparator of magnetic track number magnetic and sector number.

In one embodiment, the processing unit for reading/writing data is capable of coupling to one or more read-write head.

In one embodiment, the control unit further integrates the processing unit to become a multi-core control unit or a multi-core CPU unit.

In one embodiment, the drive arm has four read-write heads, wherein each hard disk is divided into four regions, and the hard disk is in the state after it is formatted, wherein a rule for reordering serial numbers of the sectors are: under the same track, if a track in one of the regions is bad, a track in one of the regions is marked as not usable if said track is bad for all of said four read-write heads.

In one embodiment, the storage device has a configuration setting switch to change speeds of accessing data in one of the following conditions: 8× speed be changed to 4× speed with four read-write heads accessing data synchronously for a hard disk, 2 single-side hard disks with four read-write heads accessing data synchronously; 6× speed be changed to 3× with three read-write heads accessing data synchronously, and 2× speed with two read-write heads accessing data synchronously for a hard disk.

In one embodiment, two read-write heads are arranged on each side of a hard disk, wherein four read-write heads access the hard disk synchronously.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE INVENTION

Figure 1:
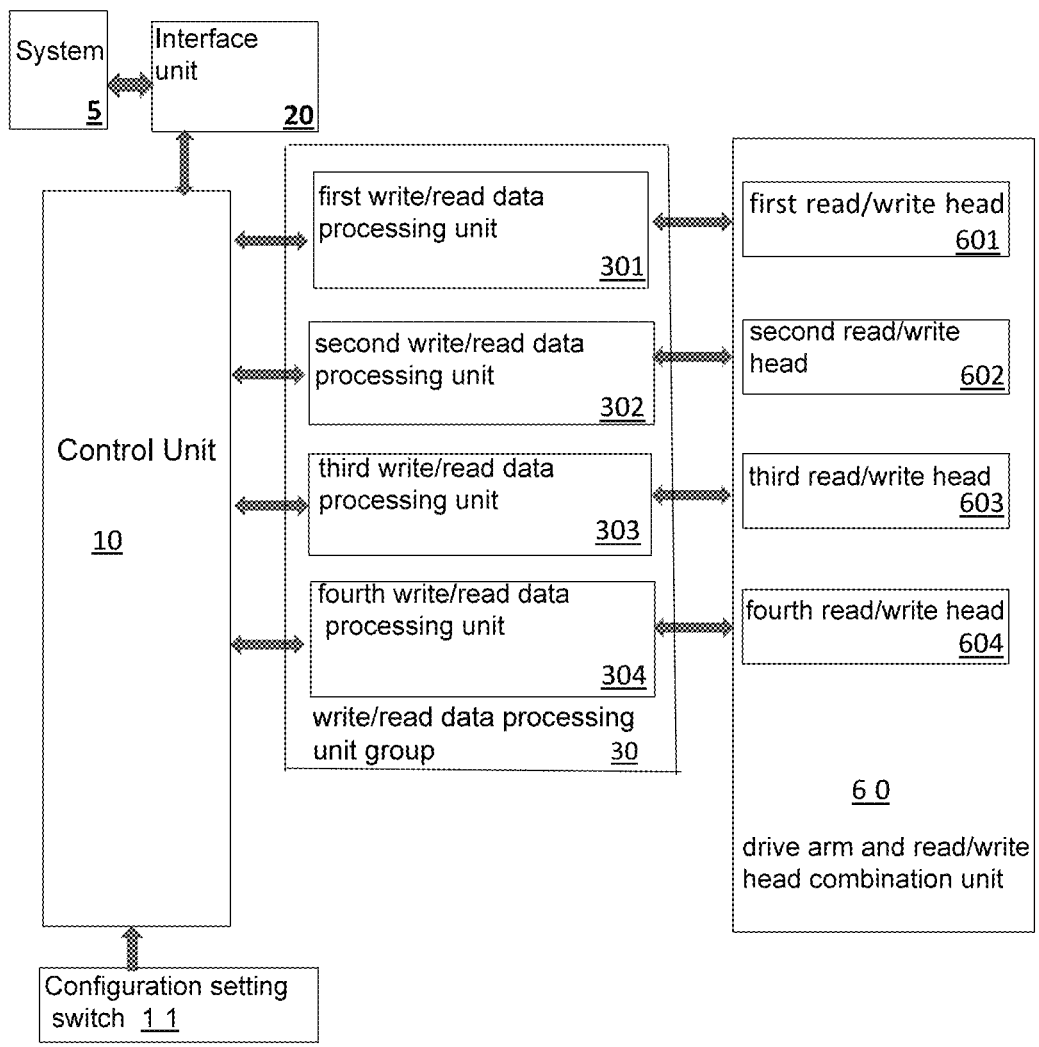
FIG. 1 is a block diagram of the internal structure of an embodiment of the present invention.

FIG. 1 is a block diagram of the internal structure of a hard disk drive of the present invention including: an interface unit 20 for each group, wherein a control unit 10 of each group is electrically coupled to the computer system through its corresponding interface, wherein the interface unit 20 can be Parallel ATA series, Serial ATA series, SCSI series, serial SCSI (SAS, Serial Attached SCSI) series, PCI-e series, SATA-express series and USB series; Although PCI-e is a Board-to-Board coupling relationship, the present invention can use PCI-e for data transmission since there is no regulation requires that HDD cannot use PCI-e as an interface.

Figure 2A:
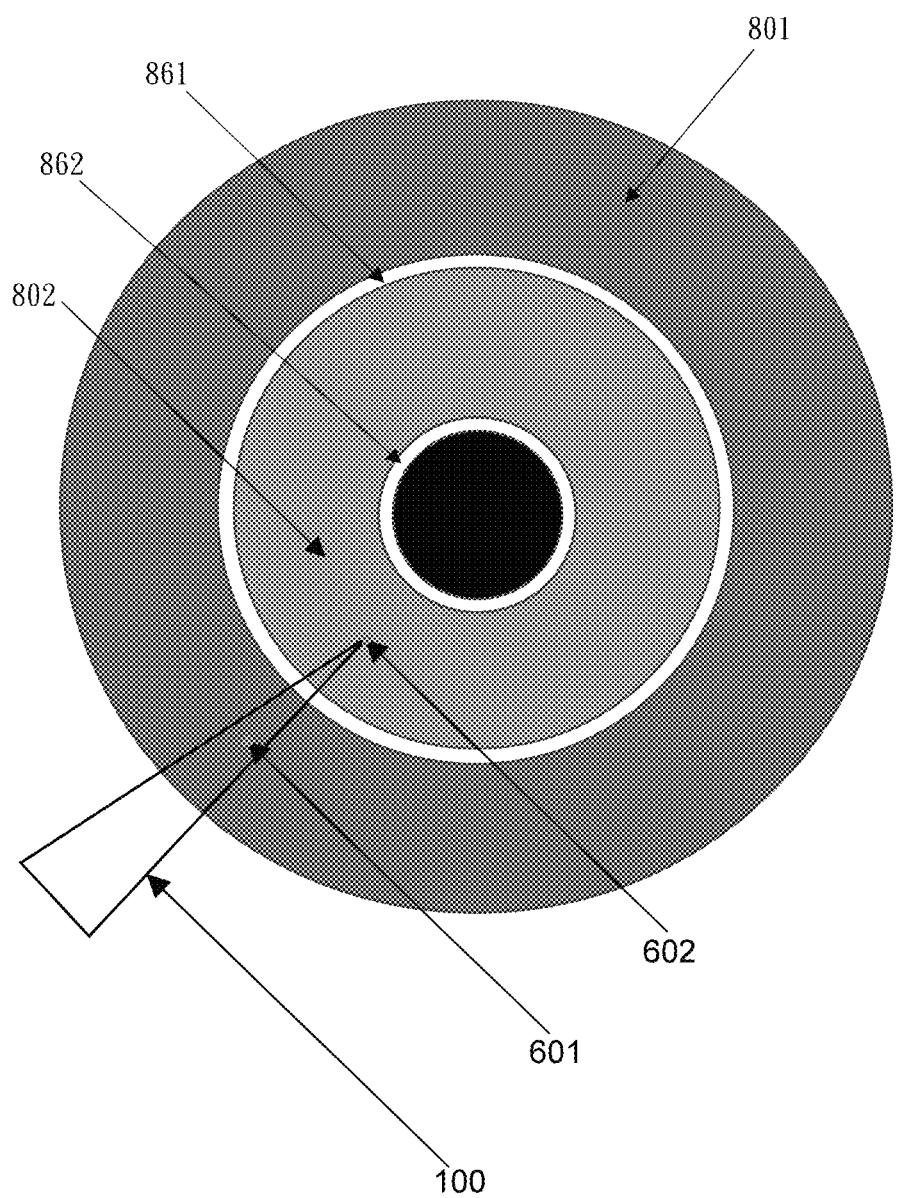
FIG. 2A is a schematic diagram of the first side of a hard disk according to an embodiment of the present invention.
Figure 2B:
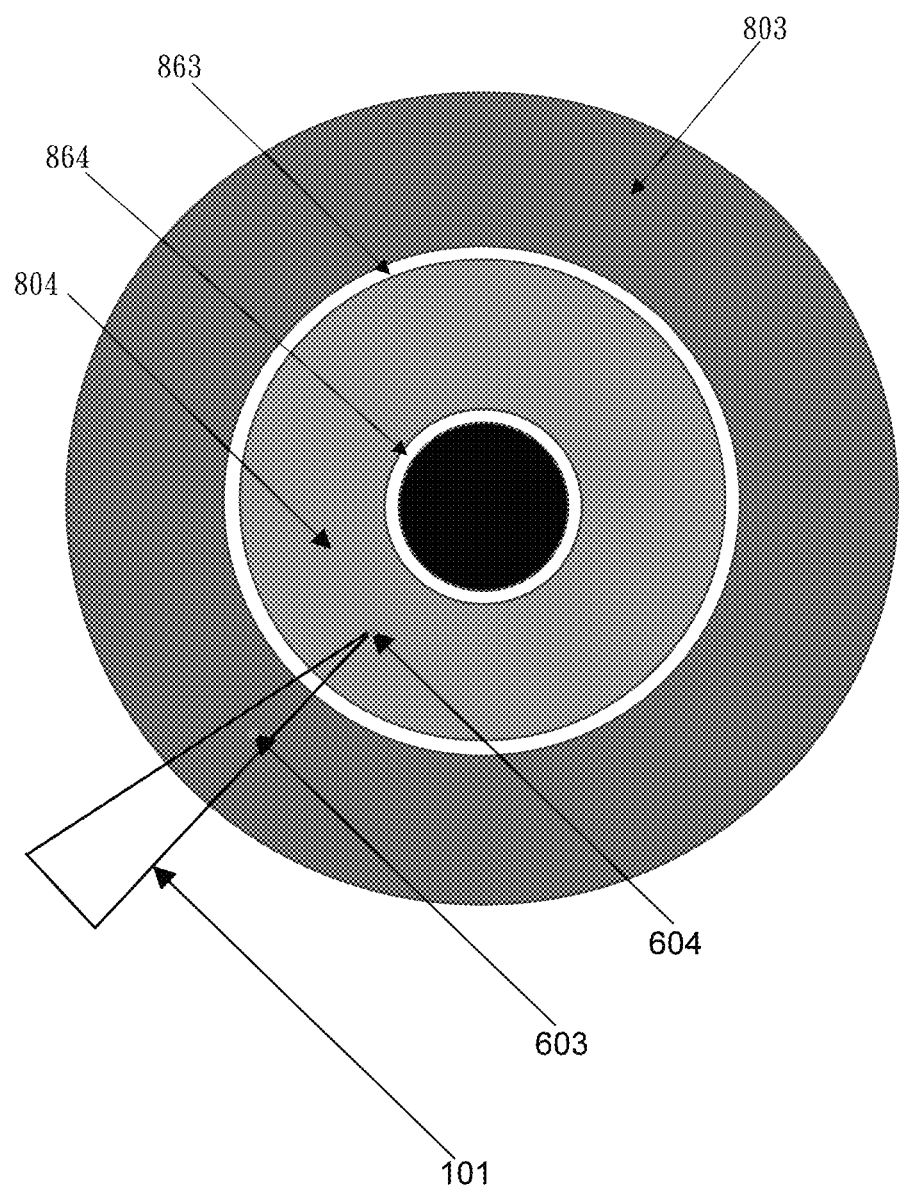
FIG. 2B is a schematic diagram of the outer sector of the second side of the hard disk in FIG. 2A.

The hard disk assembly 80 has at least one group with each group containing 1 to 12 hard disks. Each hard disk is equipped with any one of 2, 4 or 6 read-write heads. When a hard disk is equipped with 2 read-write heads, the first side of the hard disk is named the 1st Big Sector Block, and the second side of the hard disk is named the 2nd Big Sector Block. When the hard disk is equipped with 4 read-write heads, each hard disk is divided into 4 Big Sector Block including the first side (or A side) outer ring sector (side-A outer ring sectors), side-A inner ring sectors, side-B outer Ring sectors, and side-B inner ring sectors;

FIG. 2A is a schematic diagram of the region division of the first side of a hard disk in an embodiment, in which a drive arm 100 has a first read/write head 601 and a second read/write head 602, and the hard disk has an outer region 801, a landing region 861 of the first read/write head 601, the inner region 802 and a landing region 862 of the second read/write head 601. FIG. 2B is a schematic diagram of the region division on the second side of the hard disk. One of the driving arms 101 has a first read/write head 603 and a second read/write head 604. The hard disk has an outer region 803, a landing region 863 of the first read/write head 603, the inner region 804 and a landing region 864 of the second read/write head 604.

Traditional hard disks have a data-free safe region as a place where the read/write head rests or parks. This region is called the RW-Head Landing Zone or simply Landing region. In the embodiment of the present invention, both the first side and the second side of the first hard disk are designed with two read-write head landing regions, and the read-write head landing region near the center of the hard disk is called the second read-write head landing region (also It is the landing zone of a traditional hard disk), the landing zone far away from the center of the hard disk is called the first read-write head landing zone, the sector outside the first landing zone is called the outer magnetic zone, and the sector between the first landing zone and the second landing zone is called the inner sector. For example, each side of each hard disk has a total of 8,400 tracks, and each side has two read-write heads to access the data on that side. Among them, the outermost track 1 to track 4,000 is the outer magnetic zone; tracks 4,001 to 4,200 are the landing zone of the first read/write head, wherein no magnetic material coating in this region; tracks 4,201 to 8,200 are the inner magnetic zone; tracks 8,201 to 8,400 are the landing region of the second read/write head, wherein no magnetic material coating in this region. Therefore, assuming that the speed of the read-write head does not change, the time for each read-write head to move from above the first track (Track 00) to above the highest number of tracks in this case will be half that of a traditional hard disk drive. In other words, the average access time of the head (Average Access Time) is only half of the traditional hard disk drive.

The first track on the first side of the hard disk is the 00th track of the first read/write head, the 4,000th track is the 3,999th track of the first read/write head, and the 4,201th track is track 00 of the second read/write head, track 8,200 is track 3,999 of the second read/write head; track 1 on the second side of the hard disk is track 00 of the read/write head, and track 4,000 is track 3,999 of the read/write head; Track 4,201 is track 00 of the fourth read/write head, and track 8,200 is track 3,999 of the fourth read/write head.

The feature of this present invention in this example is that a single drive shaft drives 2, 4, 6, 8 or 12 read-write heads to synchronously access hard disk data. In this embodiment, there is a single shaft that drives four read-write heads to synchronously access data, when the first read/write head is pushed above the 00th track in the outer sector, the second read/write head is also positioned above the 00th track in the inner sector. At the same time, the third read-write head is located on the 00th track of the outer sector on the second side of the hard disk, while the fourth read-write head is located on the 00th track of the inner sector on the second side of the hard disk. Four read-write heads synchronously access data with a same track number in four respective regions. a control unit 10 has a central processing unit (CPU) with a firmware program, wherein writing commands and data to be written are received from the computer system through the interface unit 20, the control unit 10 selects the read/write head serial number and the number of tracks (Cylinder Number), sector number (Sector Number) to which the data will be written, and separate the written data into any of 2, 4, 6, or 8 groups. The control unit separating the data to be written into 4 groups: the first write data, the second write data, the third write data, and the fourth write data, wherein, the first write data is output to the first write/read data processing unit 301, the second write data is output to the second write/read data processing unit 302, and the third write data is output to the third write/read data processing unit 303, and the fourth write data is output to the fourth write/read data processing unit 304.

The data reading system receives the reading command from the computer system, and the control unit obtains the first magnetic track number and the first magnetic zone number stored in the file allocation table (FAT, File Allocation Table) and move the drive arm and read-write heads to the magnetic track number to read the data, and then the control unit receives the data from the first write/read data processing unit 301, the second write/read data processing unit 302, the third write/read data processing unit 303, and the fourth write/read data processing unit 304, and then read dada from four data processing units are merged into a piece of data, which is sent back to the computer system through the interface unit 20;

Write/read data processing unit group 30, at least one group, each group comprises any combination of 2, 4, 6, 8 or 12 write/read data processing units, wherein 2 write/read data processing units with 2 read/write heads is 2× speed; 4 write/read data processing units with 4 read/write heads is 4× speed; 6 write/read data processing units with 6 read-write heads is 6× speed; 8 write/read data processing units with 8 read-write heads is 8× speed; 12 write/read data processing units with 12 read-write heads is 12× speed. One end of each write/read data processing unit is electrically coupled to the control unit, and the other end is electrically coupled to its corresponding read/write head. In one embodiment, the control unit further integrates the processing unit to become a multi-core control unit or a multi-core CPU unit.

In this embodiment, a single drive shaft drives four read-write heads to synchronously access data at four times the speed, so there are four write/read data processing units, respectively, the first write/read data processing unit 301 and the second The writing/reading data processing unit 302, the third writing/reading data processing unit 303, and the fourth writing/reading data processing unit 304 are composed, and the first writing/reading data processing unit 301 is electrically coupled to the first read/write head 601, the second write/read data processing unit 302 is electrically coupled to the second read/write head 602, the third write/read data processing unit 303 is electrically coupled to the third write head 603, and the fourth write/read data processing unit 304 is electrically coupled to the fourth read/write head 604.

The first write/read data processing unit 301 outputs the first write data sent from the control unit 10 with the CRC code of the first write data to the first read/write head 601 during the write operation, the first write data will be written in the first outer ring sector 801 of the first hard disk 81 to complete the data writing operation; in the read operation, the first outer ring of the first hard disk 81 will be read by the first read/write head 601, and CRC are used to check the data and correct errors, and then send it back to the control unit 10; The second write/read data processing unit 302 outputs the second write data sent from the control unit 10 with the CRC code of the second write data to the second read/write head 602 during the write operation. The second write data will be written in the first inner ring sector 802 of the first hard disk 81 to complete the data writing operation; in the read operation, the first inner ring sector 802 will be read by the first read/write head 601, and CRC are used to check the data and correct errors, and then send it back to the control unit 10; the third write/read data processing unit 303 outputs the third write data sent from the control unit 10 with the CRC code of the third write data to the third read/write head 603 during the write operation, wherein the third write data will be written in the second outer sector 803 of the first hard disk 81 to complete the data writing operation; in the read operation, the second outer sector 803 will be read by the third read/write head 603, and CRC are used to check the data and correct errors, and then send it back to the control unit 10; The fourth write/read data processing unit 304 outputs the fourth write data sent from the control unit 10 with the CRC code of the fourth write data to the fourth read/write head 604 during the write operation. The fourth write data will be written in the inner sector 804 of the second side of the hard disk to complete the data writing operation; in the read operation, the inner sector 804 of the second side of the first hard disk 81 will be read by the fourth read/write head 604, and CRC are used to check the data and correct errors, and then send it back to the control unit 10.

Figure 3:
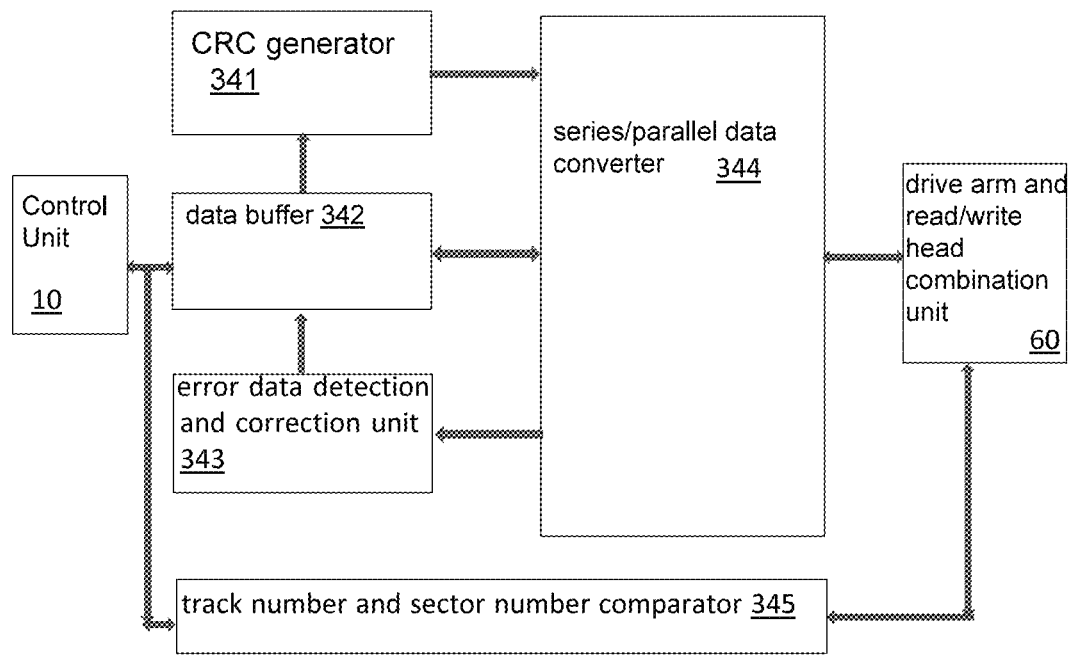
FIG. 3 is a block diagram of the internal structure of write/read data processing unit according to an embodiment of the present invention.

FIG. 3 is a diagram of the internal structure of the write/read data processing units 301, 302, 303, and 304, all of which comprises a microcontroller and IC(s) or they can be integrated into the control unit 10. The write/read data processing unit contains at least any of 5 main parts as following:

(1) data buffer (Buffer) 342: includes a random-access memory (RAM, Random Access Memory) or other volatile memory (Volatile Memory) with a capacity not less than the size of a hard disk drive sector (Sector);

(2) CRC generator 341: when the file is written into the data buffer 342, a CRC code is generated according to the data content. CRC is a cyclic redundancy check, which is a hash function that generates short fixed-digit verification codes based on data packets or computer files. It is mainly used to detect or verify data transmission or storage for errors that may occur later, generally use 32-bit (CRC32) integers;

(3) error data detection and correction unit 343: When the file is read, it automatically checks whether the data content is wrong according to the CRC content and corrects the wrong data;

(4) series/parallel data converter 344: when writing files, it converts the parallel data in the buffer into serial data and then writes it into the hard disk together with the CRC code; when the file is read, it converts the incoming serial data from the read/write head and CRC code into parallel data and placed in a buffer before being read by the control unit 10;

(5) the track number and sector number comparator 345: when the file is written or read, the control unit 10 sends the track number and sector number data to the drive arm and the read/write head combination unit 60 and the first data processing unit 301, the second write/read data processing unit 302, the third write/read data processing unit 303, and the fourth write/read data processing unit 304, when the read/write head is moved to the target on the magnetic track, the read-write heads sends the track number and sector number that heads are positioned back to the first read-write data processing unit 301, the second read-write data processing unit 302, and the third read-write data processing unit 303 and the fourth read-write data processing unit 304, the track number and sector number comparator 345 compares whether the track number and sector number that heads are positioned are the same as the track number and sector number sent by the control unit 10, wherein if they are the same, the first write/read data processing unit 301, the second write/read data processing unit 302, the third write/read data processing unit 303, and the fourth write/read data processing unit 304 start to perform data writing or reading tasks; if they are not the same, the control unit 10 adjusts the position of the head. Since the first read-write head, second read-write head, third read-write head and the fourth read-write head access data synchronously, under normal circumstances, the four read-write heads should read the same track number and sector number and the track number and sector number that heads are positioned are the same as the track number and sector number sent by the control unit 10. If it is different, the control unit 10 will be notified to adjust the head position.

Permanent magnet (Permanent magnet) combination 50, at least one group, each group comprises two permanent magnets, wherein a voice coil motor (VCM) is placed in the magnetic field generated by the two permanent magnets. When current passes through the coil, under the influence of the magnetic field, the driving arm and the read-write head combination unit 60 are moved by the leverage of the actuator axis.

Actuator Arm and read/write head combination unit 60, at least one set, each set contains voice coil motor (VCM), actuator Axis, read/write head (RW-Head) and related components, the control unit controls the voice coil motor to move the read-write head to the target track position. The number of read-write heads is always 2 times or 4 times the number of hard disks. When the number of read/write heads is twice the number of hard disks, the first read/write head is coupled to the first write/read data processing unit to access data on the first side of the first hard disk, and the second read/write head is coupled to the second write/read data processing unit to access the data on the second side of the first hard disk; when the number of read/write heads is 4 times the number of hard disks, the first read-write head is coupled to the first write/read data processing unit to access data in the outer sector 801 on the first side of the first hard disk, the second read/write head is coupled to the second write/read data processing unit to access the data in the inner ring sector 802 on the first side of the first hard disk, and the third read/write head is coupled to the third write/read data processing unit to access data in the outer sector 803, the fourth read/write head is coupled to the fourth write/read data processing unit to access data in the second inner sector 804 of the first hard disk.

Spindle motor 70, at least one group, each group provides a stable speed of the hard disk (platter), usually but not limited to any one of 5,400 rpm, 7,200 rpm, 10 Krpm, 15 Krpm, etc.

The first power supply circuit unit 90, the power supply comes from +5 volts or +5 volts and +12 volts of the computer system, and the power supply circuit unit converts it into different voltages to supply internal components of the hard disk drive.

Configuration setting switch 11, at least one set, each set is a set of switches used to determine the configuration of the hard disk drive, for example, a hard disk drive with 2 hard disks and 8 read-write heads, you can select this 8 read-write heads synchronously access data to achieve 8-times-speed data access or divide into 2 groups, each containing 4 read-write heads, and each group can achieve four-times-speed data access speed in two configurations, see Table 1, which shows the relationship between transmission rate, hard disk and the number of read-write heads.

TABLE 1

| Structure | Data Transfer Speed | Total Number of Disks | Total Number of R/W heads | Descriptions |
|---|---|---|---|---|
| X1 | X12 | X2 | X12 | 2 hard disks are equipped with 12 read-write heads, and 12 read-write heads are simultaneously accessed at 12 times the speed |
| | | | | ①The first hard disk, the first side, the outer region is accessed by the first read-write head |
| | | | | ②The first hard disk, the first side, the middle region is accessed by the second read-write head |
| | | | | ③The first hard disk, the first side, the inner region is accessed by the third read-write head |
| | | | | ④The first hard disk, the second side, the outer region is accessed by the fourth read-write head |
| | | | | ⑤The first hard disk, the second side, the middle region is accessed by the fifth read-write head |
| | | | | ⑥The first hard disk, the second side, the inner region is accessed by the sixth read-write head |
| | | | | ⑦The second hard disk, the first side, the outer region is accessed by the first read-write head |
| | | | | ⑧The second hard disk, the first side, the middle region is accessed by the second read-write head |
| | | | | ⑨The second hard disk, the first side, the inner region is accessed by the third read-write head |
| | | | | ⑩ The second hard disk, the second side, the outer region is accessed by the fourth read-write head |
| | | | | ⑪ The second hard disk, the second side, the middle region is accessed by the fifth read-write head |
| | | | | ⑫ The second hard disk, the second side, the inner region is accessed by the sixth read-write head |

TABLE 1-continued

| Structure | Data Transfer Speed | Total Number of Disks | Total Number of R/W heads | Descriptions |
|---|---|---|---|---|
| X2 | X8 | X2 | X8 | 2 hard disks are equipped with 8 read-write heads, 8 read-write heads are simultaneously accessed at 8 times speed<br>①The first hard disk, the first side, the outer region is accessed by the first read-write head<br>②The first hard disk, the first side, the inner region is accessed by the second read-write head<br>③The first hard disk, the second side, the outer region is accessed by the third read-write head<br>④The first hard disk, the second side, the inner region is accessed by the fourth read-write head<br>⑤The second hard disk, the first side, the outer region is accessed by the fifth read-write head<br>⑥The second hard disk, the first side, the inner region is accessed by the sixth read-write head<br>⑦The second hard disk, the second side, the outer region is accessed by the seventh read-write head<br>⑧The second hard disk, the second side, the inner region is accessed by the 8th read-write head |
| X3 | X4 | X2 | X8 | 2 hard disks are equipped with 8 read-write heads but only 4 read-write heads are simultaneously accessed at 4 times the speed<br>There are two ways of implementation:<br>(1) Only one hard disk is accessed at the same time (4 read-write heads are accessed simultaneously), that is, the 1st to 4th read-write heads or the 5th to 8th read-write heads are synchronously accessed.<br>(2) Simultaneously access the first or second side of two hard disks (4 read-write heads synchronous access), namely the first, third, fifth, seventh, etc. 4 read-write heads synchronous access or 2nd, 4th, 6th, 8th, etc. 4 read-write head synchronous access |
| X4 | X4 | X1 | X4 | In the implementation example of this case, a hard disk is equipped with 4 read-write heads, and the synchronous access of the 4 read-write heads is 4 times the speed<br>①The first hard disk, the first side, the outer region is accessed by the first read-write head<br>②The first hard disk, the first side, the inner region is accessed by the second read-write head<br>③The first hard disk, the second side, the outer region is accessed by the third read-write head<br>④The first hard disk, the second side, the inner region is accessed by the fourth read-write head |
| X5 | X4 | X2 | X4 | 2 hard disks are equipped with 4 read-write heads, and the simultaneous access of 4 read-write heads is 4 times the speed<br>①The first hard disk, the first side, configure the first read-write head<br>②The first hard disk, the second side, configure the second read-write head<br>③The second hard disk, the first side, configure the third read-write head<br>④The second hard disk, the second side, equipped with the fourth read-write head |
| X 6 | X 6 | X 3 | X 6 | 3 hard disks are equipped with 6 read-write heads, and the simultaneous access of 6 read-write heads is 6 times the speed<br>①The first hard disk, the first side, configure the first read-write head<br>②The first hard disk, the second side, configure the second read-write head<br>③The second hard disk, the first side, configure the third read-write head<br>④The second hard disk, the second side, equipped with the fourth read-write head<br>⑤The third hard disk, the first side, configure the fifth read-write head<br>⑥The third hard disk, the second side, configure the sixth read-write head |
| X 7 | X 3 | X 3 | X 6 | Three hard disks are equipped with 6 read-write heads, but only 3 read-write heads can access synchronously at the same time. This is 3 times the speed. There are two implementation methods:<br>Method 1: At the same time, the three read-write heads on the first side of the three hard disks are simultaneously accessed:<br>①The first hard disk, the first side, the first read/write head<br>②The second hard disk, the first side, the third read-write head<br>③The third hard disk, the first side, the fifth read-write head<br>Method 2: At the same time, the three read-write heads on the second side of the three hard disks are simultaneously accessed:<br>①The first hard disk, the second side, the second read-write head |

TABLE 1-continued

| Structure | Data Transfer Speed | Total Number of Disks | Total Number of R/W heads | Descriptions |
|---|---|---|---|---|
| X 8 | X 2 | X 2 | X 4 | ②The second hard disk, the second side, the fourth read/write head<br>③The third hard disk, the second side, the sixth read-write head<br>Two hard disks are equipped with 4 read-write heads but only two read-write heads are simultaneously accessed at the same time. The speed is 2 times. There are two implementation methods:<br>(1) Double speed method with single disc and double read-write head<br>①The first side (A side) of the first hard disk is accessed by the first read-write head<br>②The second side (B side) of the first hard disk is accessed by the second read-write head<br>(2) Double-disc single-sided double-speed method<br>①The first side (A side) of the first hard disk is accessed by the first read-write head<br>②The first side (A side) of the second hard disk is accessed by the third read-write head |

The present invention uses a single drive arm to synchronously access the hard disk drive with multiple read-write heads. Since the number of hard disks in the hard disk drive is different from the configuration of the read-write heads, the following combinations are included but not limited:

(1) 1P2S4H single-disk 4 times speed: The description of this case uses this combination as an example. There is only one hard disk in the hard disk drive. The hard disk has two sides called the first side and the second side. Each side is configured with 2 with a total of 4 read-write heads. The read-write heads on the first side are called the first read-write head 601 and the second read-write head 602. The first read-write head accesses the first side of the hard disk. The outer sector, the second read/write head accesses the inner sector of the first side of the first hard disk, see FIG. 2A; the read/write head on the second side of the hard disk is called the third read/write head 603 and the fourth read/write head 604, in which the third read/write head accesses the outer sector on the second side of the hard disk, and the fourth read/write head accesses the inner sector on the second side of the first hard disk, which means A hard disk is equipped with a total of 4 read-write heads, and these 4 read-write heads are accessed at the same time, so 4 write/read data processing units (301~304 in FIG. 1) are required respectively and 4 read/write The head is electrically coupled. Because the above four read-write heads are accessed synchronously, the time for writing data to and reading back data from the hard disk under the same amount of data transfer will be reduced by 75% compared to a normal drive. The average access time has also been reduced by 75%, in other words performance is 4 times that of ordinary hard drives. Under this architecture, because the two read-write heads on the first side and the two read-write heads on the second side of the hard disk, a total of four read-write heads access the same cylinder number and number of sectors at the same time (Sector Number) data, it is necessary to design a cluster (Cluster) equal to 4 sectors (Sector) or a multiple of 4 sectors. In addition, general hard disks have a safe region with no data, which serves as a rest or park place for the read/write head. This region is called the RW-Head Landing Zone. When the hard disk drive of the present invention is of 1P2S4H and 2P4S8H architectures, each side of each hard disk must reserve two read-write head landing regions, in other words, each side is equipped with two read-write heads and two landing regions. This is also another feature of the present invention, see FIG. 2A.

(2) 2P4S8H dual-disc 8× speed: there are 2 hard disks in a hard disk drive. Each hard disk has two sides called the first side and the second side. Each side is equipped with 2 read-write heads. The first hard disk is equipped with 4 read-write heads. As mentioned in (1) above, the second hard disk is also equipped with 4, a total of 8 read-write heads, which means this hard drive contains 2 hard disks. A total of 8 read-write heads are configured. During data writing and data reading, the 8 read-write heads access at the same time, so 8 write/read data processing units are required to be electrically coupled to the 8 read-write heads, so data is written to the hard disk The time it takes to read back slices and data from a hard disk is one-eighth of that of a normal hard disk drive, and the average access time of the read/write head is also reduced by 87.5%, in other words the performance is equivalent to that of a normal hard disk drive 8 times. Under this structure, since a total of 8 read-write heads on the first hard disk and the second hard disk access the same track number and sector number data at the same time, it is necessary to design a cluster equal to 8 sectors or 8 Multiple sectors.

Figure 2C:
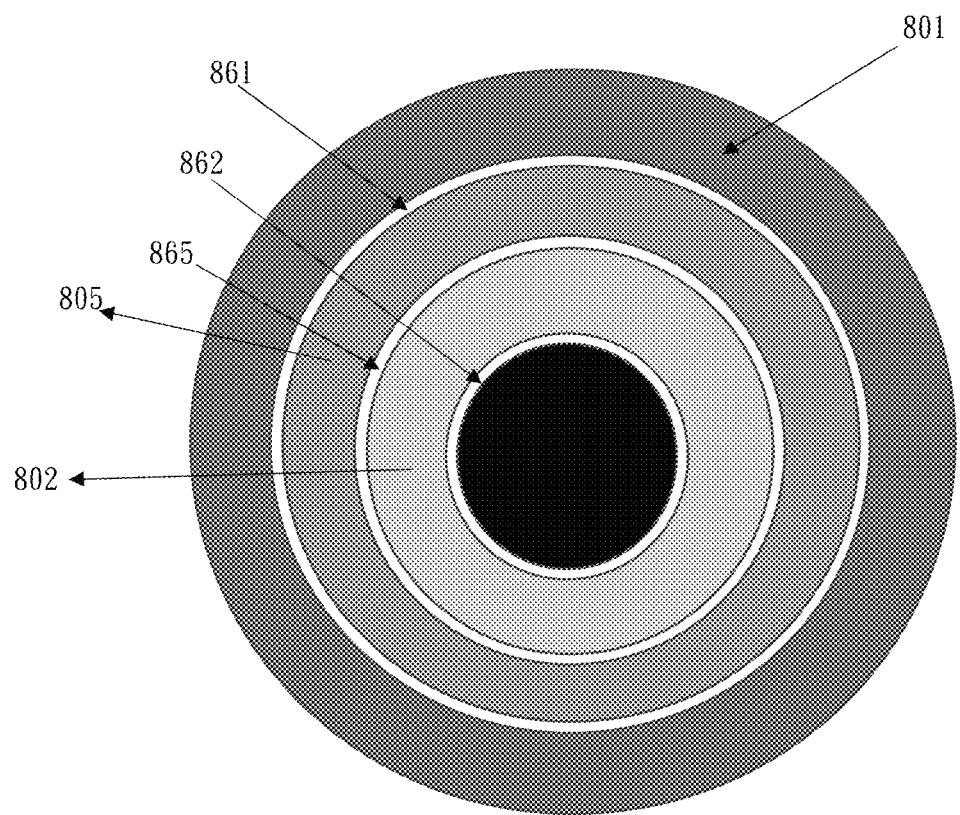
FIG. 2C is a schematic diagram of the first side of a hard disk according to another embodiment of the present invention.

(3) 2P4S12H dual-disc 12 times speed: there are 2 hard disks in a hard disk drive. Each hard disk has two sides called the first side and the second side. Refer to FIG. 2C, each side has its own Equipped with 3 read-write heads, each side of the hard disk is divided into 3 sectors, which are the outer ring, the middle circle and the inner ring. The three read-write heads each access their own magnetic zone, namely the first The hard disk is equipped with 6 read-write heads, the second hard disk is also equipped with 6 read-write heads and a total of 12 read-write heads, which means that the hard disk drive contains 2 hard disks and a total of 12 Read and write heads. During data writing and data reading, the 12 read-write heads access at the same time, so 12 write/read data processing units are required to be electrically coupled to the 12 read-write heads, so data is written to the hard disk. The time it takes to read back slices and data from a hard disk is one-twelfth of that of a normal hard disk drive, and the average access time of the read/write head has also been reduced by 91.7%. In other words, the performance is equivalent to that of a normal hard disk drive. 12 times. Refer to FIG. 2C. When the hard disk drive of the present invention is of 2P4S12H architecture, each side of each hard disk must reserve three read-write head landing regions, in other words, each side is equipped with three read-write heads and three landing regions.

(4) 3P6S6H three-disc 6× speed: There are three hard disks in the hard disk drive. Each hard disk has two sides called the first side and the second side. Each side is equipped with a read-write head. The hard disk has 6 read-write heads to access data at the same time, so 6 write/read data processing units are needed. Due to the simultaneous access of 6 read-write heads, the time it takes to write data to the hard disk and read back data from the hard disk under the same amount of data will be 83% less than the average hard disk drive and the average read-write head average access time has also been reduced by 83%, in other words performance is 6 times that of ordinary hard drives. Generally, the access time of a hard disk drive is about 9~15 ms.

One of the characteristics of the present invention is that a hard disk drive is electrically coupled according to the number of hard disks contained in the hard disk drive and the number of read-write heads arranged on each side of each hard disk and each read-write head The number of write/read data processing units can achieve different data access performance. Furthermore, the above four architectures can change the data transmission performance by making the following configuration setting changes on the hard disk drive production side according to the needs. This technology is also unique to this patent, see Table 1:

(1) 8× speed to 4× speed: Assuming that the structure of the hard disk drive has 2 hard disks and 8 read-write heads for simultaneous access to this patented 8× speed hard disk drive, it can be set by using the configuration setting switch 11. Change to 4× speed hard disk drive, and 4× speed hard disk drive can be set to (1) single hard disk 4× speed or 2 hard disks single access 4× speed.

(2) 4× speed to 2× speed: Set the hard disk drive to have 2 hard disks and 4 read-write heads for simultaneous access to a 4× speed hard disk drive, which can be changed to by using configuration setting switch 11 2× speed hard disk drive; and 2× speed hard disk drive can be set to (1) single hard disk 2× speed or 2 hard disk single side access 2× speed.

(3) 6× speed to 3 or 2× speed: Set the hard disk drive to have 3 hard disks and 6 read-write heads for simultaneous access to a 6× speed hard disk drive, which can be changed by using the configuration setting switch 11. Change to (1) 3 single side of hard disk (the same as the first side or second side) 3 read-write head synchronous access to 3× speed hard disk drive (2) 2× speed single disc 2 read-write head synchronous access to 2× speed hard drive.

The present invention includes at least three types of architectures: 1P2S4H, 2P4S8H, and 3P6S6H, and produces 2, 4, 6 and 8 times the performance of ordinary hard disk drives. Here, only the first architecture 1P2S4H is a hard disk Four read-write heads synchronously access data as an example, and the implementation is illustrated with FIG. 1, FIG. 3, and FIG. 4.

As shown in FIG. 1, when a file is written: the firmware program (file management) in the control unit 10 will determine the file to be written based on the available sector (or cluster) of the current hard disk and the file size To which magnetic regions of which tracks, a set of data is sent to the voice coil motor (VCM), move the drive arm and read-write head combination unit 60 to the destination magnetic track, and simultaneously send the data of the number of magnetic tracks and the number of magnetic regions to the first Write/read data processing unit 301, second write/read data processing unit 302, third write/read data processing unit 303, and fourth write/read data processing unit 304; then control unit 10 First, a file to be written to the disk is divided into 4 parts. The method of partitioning is to divide a sector size (a sector size is generally defined as 512 Byte or 4 KByte) as the unit and sequentially divided into the first write disk. Region, the second write region, the third write region, and the fourth write region. After the completion, the contents of the four sectors are sorted to obtain the first write data, the second write data, and the third write Input data and fourth write data. After the file is divided, these 4 parts of data are sent to the first write/read data processing unit 301, the second write/read data processing unit 302, and the third write/read data processing unit 301, respectively. A read data processing unit 303 and a fourth write/read data processing unit 304. For example, when writing a file with a size of 2,047 Byte, the control unit 10 first divides the file into three 512 Bytes and 511 Bytes, and sends them to the first write/read data processing unit 301 and the second write/read data processing unit 301, respectively. Output data processing unit 302, third write/read data processing unit 303, and fourth write/read data processing unit 304.

When the first write/read data processing unit 301, the second write/read data processing unit 302, the third write/read data processing unit 303, and the fourth write/read data processing unit 304 receive After the target region track number data sent by the control unit 10, the data from the first read/write head (RW-Head-1) 601, the second read/write head (RW-Head-2) 602, and the third The number of tracks read back by the read-write head (RW-Head-3) 603 and the fourth read-write head (RW-Head-4) 604 (FIG. 3, 345). If any of the four sets of data are different, it means If the position of the read/write head is wrong, notify the control unit 10 to adjust it, if it is the same, then write data: when the first write/read data processing unit 301, the second write/read data processing unit 302, and the third The write/read data processing unit 303 and the fourth write/read data processing unit 304 receive the first write data, the second write data, the third write data, and the fourth write from the control unit 10 After entering data and other segmented data, they will generate CRC codes according to the content of the data (FIG. 3, 341), and convert the data together with CRC into serial data (FIG. 3, 344), and then sequentially pass the data through the first reading The write head 601, the second read/write head 602, the third read/write head 603, and the fourth read/write head 604 write to the outer sector 801 of the first side of the first hard disk, and the first inner ring of the first hard disk The sector 802, the outer sector 803 on the second side of the first hard disk and the inner sector 804 on the second side of the first hard disk are designated in the sector. In the above example, the first write/read data processing unit 301 will send the 512 Byte data and the CRC to the first read/write head 601 and write the specified number of tracks in the outer ring region 801 on the first side of the first hard disk. In terms of the number of sectors, the second write/read data processing unit 302 sends the 512 Byte data and CRC to the second read/write head 602 and writes them to the designated track of the first side of the first hard disk inner ring sector 802 The third write/read data processing unit 303 sends the 512 Byte data and CRC to the third read/write head 603 and writes it into the second outer ring sector 803 of the first hard disk. The fourth write/read data processing unit 304 will send the 511 Byte data and the CRC to the fourth read/write head 604 on the number of tracks and the number of sectors at the same time, and write it into the inner sector of the second side of the first hard disk. 804 specifies the number of tracks and the number of sectors, and the number of tracks of the four is the same as the number of sectors. For example, the eighth sector of the 500th track is written in the same way to complete the writing of 2,047 Byte files.

When the system side issues a file read command, the control unit 10 obtains the track number data of the first storage sector of the file content according to the file allocation table (FAT). It should be noted that in general hard disk drives in the FAT, the read/write head number (for example, the first read/write head or the second read/write head, etc.) is contained in the FAT. In this embodiment, four read/write heads access at the same time. The control unit 10 sends a set of data to the voice coil motor (VCM), moves the four synchronous access read-write heads to the target track number at the same time, and sends the track number and the number of magnetic regions to the first write/read Output data processing unit 301, second write/read data processing unit 302, third write/read data processing unit 303, and fourth write/read data processing unit 304; When the first write/read data processing unit 301, the second write/read data processing unit 302, the third write/read data processing unit 303, and the fourth write/read data processing unit 304 receive After the target region track number data sent by the control unit 10, the data from the first read/write head 601, the second read/write head 602, the third read/write head 603, and the fourth read/write head 604 need to be compared and read back. Track number and sector number data (FIG. 3, 345). If the two data are different, it means that the position of the read-write head is wrong, and notify the control unit 10 to adjust (correct the data sent to the voice coil motor VCM), if they are the same, start processing Read data: The first read/write head 601 in the drive arm and read/write head combination unit 60 reads the first sector data and CRC content of the file on the outer sector of the first side of the first hard disk to the first write The input/read data processing unit 301 and the second read/write head 602 read the first sector data and CRC content of the file on the inner ring of the first side of the first hard disk to the second write/read data The processing unit 302 and the third read/write head 603 read the first sector data and CRC content of the file in the outer sector on the second side of the first hard disk to the third write/read data processing unit 303 and the fourth read/write head 604 reads the first sector data and the CRC content of the file in the inner ring region on the second side of the first hard disk to the fourth write/read data processing unit 304; the processing unit 301 first converts the serial data into parallel data and checks that the read sector data is correct according to its CRC content (FIG. 3, 343), the second write/read data processing unit 302 first converts the serial data After the serial data is converted to parallel data and the read sector data is checked correctly according to its CRC content, the third write/read data processing unit 303 first converts the serial data to parallel data and checks the read sector according to its CRC content after the data is correct, and the fourth write/read data processing unit 304 first converts the serial data to parallel data and checks that the read sector data is correct according to its CRC content, and then sends the data of this sector back to the control individually; the control unit 10 merges the four pieces of data into four complete sectors, and sends them back to the computer system through the interface unit. If the file content is greater than four sectors, the control unit will use the index of the next storage sector of the file, continue to read the contents of the next two sectors, until all the contents of the file are read. Taking the same example as above, after the control unit 10 knows the track position of the file storage from the FAT, it first controls the drive arm and the read/write head unit 60 to move the read/write head to the track position, and the first read The write head 601 will read the 512 Byte data to the first write/read data processing unit 301 and the second read/write head unit 602 will read the 510 Byte data to the second write/read data processing unit 302, The three read/write heads 603 will read the 512 Byte data to the third write/read data processing unit 303 and the fourth read/write head unit 604 will read the 511 Byte data to the fourth write/read data processing unit 304 in. Next, the first write/read data processing unit 301 and the second write/read data processing unit 302, the third write/read data processing unit 303, and the fourth write/read data processing unit 304, respectively Interpret the data by CRC, correct it if there is an error, and send the data to the control unit 10 when the data is correct.

After the control unit 10 receives the 512 Byte, 512 Byte, 512 Byte, and 511 Byte data in the above example, it integrates the data into 2047 Byte, and sends the data back to the computer system through the interface unit 20 to complete the file reading action.

Differences between hard disk drives of present invention and traditional hard disk drives including: first, each side of the traditional hard disk drive only has one read-write head to access data; second, the read-write head on the first side and the second side of the traditional hard disk drive are not synchronized for accessing data, a piece of data (a file) may be written into the first side and the second side respectively, or only the first side or the second side, but in this case, the first read/write head 601, the second read/write head The head 602, the third read-write head 603, and the fourth read-write head 604 access the whole data synchronously, so the file storage rules need to be modified. The example is as follows: If a small file uses only one sector, the number of tracks is 100 and the number of sectors is 03 on the outer ring of the first side of the hard disk, then The corresponding tracks and sectors in the inner ring on the first side of the of the hard disk, the outer ring on the second side and the inner ring on the second side will be reserved and will not be used by other files, in short the hard disk has the same number of tracks on the first side of the outer ring, the first side of the inner ring, the second side of the outer ring, and the second side of the inner ring. the same number of sectors can only be used for read/write a same file. Those who are familiar with hard disk drive technology know that there are inevitably bad sectors in the hard drive production stage. The hard drive factory will mark these bad sectors and replace them with reserved sectors under the same track. Finally, all the bad sectors have been sorted out and the bad sector list P-List (Primary Defect List) is generated. After the hard drive leaves the factory, the user cannot see the bad sector list. These bad sectors will not affect the user.

Figure 4:
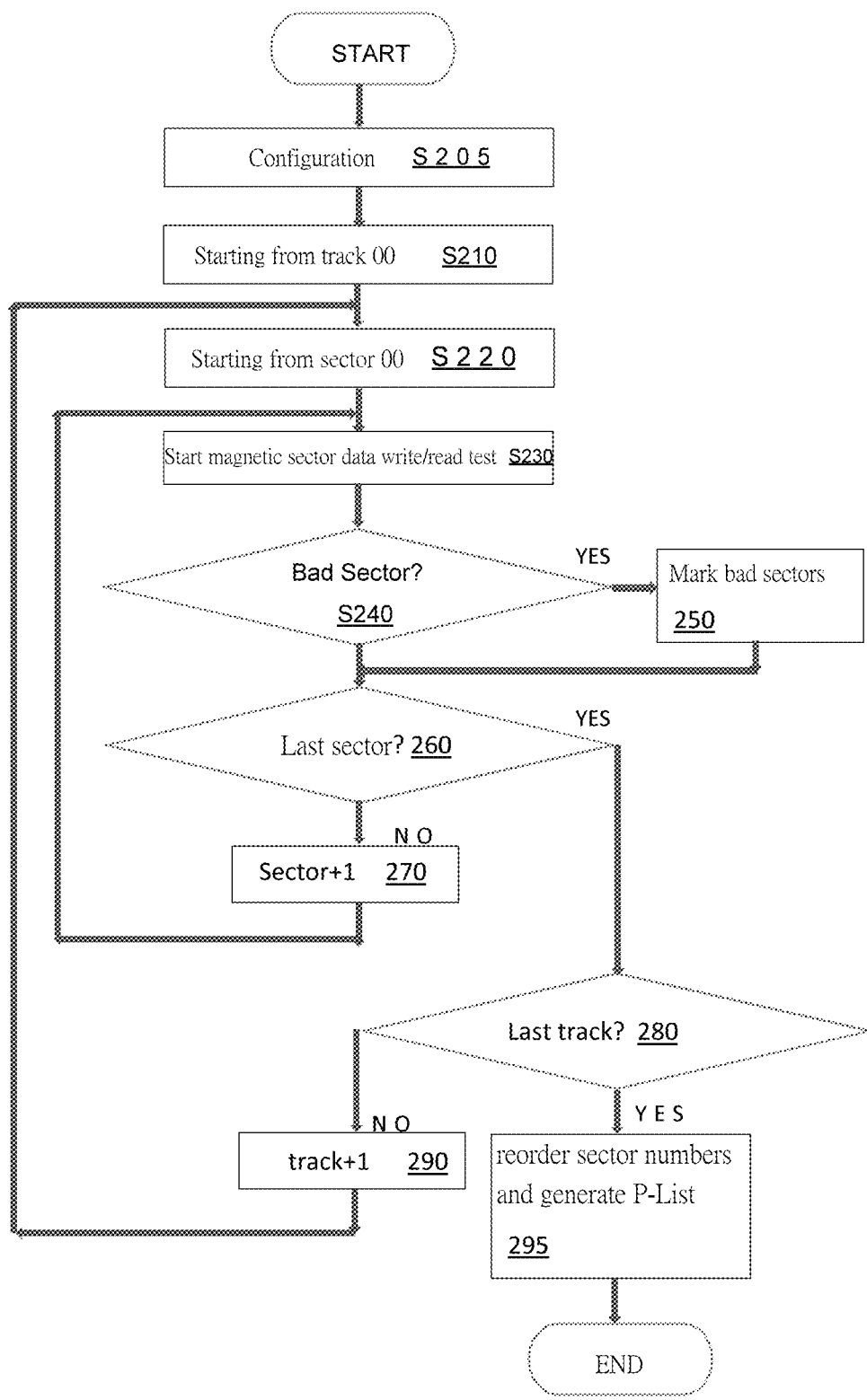
FIG. 4 is a low-level programming method for formatting a hard disk according to an embodiment of the present invention.

FIG. 4 is a low-level format (Low-Level Format) flow chart, in which steps S210 to S290 are different from those of a general hard disk drive. This embodiment uses 4 read-write heads to access synchronously while the general hard disk drive is at the same time, only a single read/write head accesses. Step S295 is one of the features of the present invention. This step S295 reorders sector numbers and generates P-List. The rules are as follows: Under the same cylinder (Cylinder), If a certain region on one side (such as the outer sector on the first side) has a bad number of sectors (for example, the number of sectors 03), when performing step S295 reordering, place the other three regions (including the first inner ring sector, the second outer ring sector and the second inner ring sector) the same number of sectors (number of sectors 03) is marked as "not use", so that the number of sectors accessed by the first, second, third and fourth read-write heads are the same to achieve the purpose of improving access performance. The steps to perform low-level formatting of the hard drive are as follows:

(S205) Configuration of the hard disk is performed.

(S210) Starting from track 00, the control unit 10 sends vector data to the voice coil motor of the drive arm and read/write head combination unit 60. The voice coil motor pushes the read/write head to the outermost track 00 of the hard disk. The control unit 10 simultaneously send out the track count and magnetic sector count data to the first write/read data processing unit 301, the second write/read data processing unit 302, the third write/read data processing unit 303, and the fourth write Input/read data processing unit 304; because four read-write heads act at the same time, the first read-write head 601 and the second read-write head 602, the third read-write head 603 and the fourth read-write head 604 are moved simultaneously To track 00; then the four read-write heads read the number of tracks and the number of sectors is sent back to the first write/read data processing unit 301, the second write/read data processing unit 302, and the third write/read data processing unit 301 The read data processing unit 303 and the fourth write/read data processing unit 304 confirm that the position of the read/write head is correct, and if there is an error, send it back to the control unit 10 for correction;

(S220) Starting from sector 00, the read-write head reads the number of tracks and the number of sectors information and sends back to the first write/read data processing unit 301, the second write/read data processing unit 302, and the third The write/read data processing unit 303 and the fourth write/read data processing unit 304 determine that the read-write head is in the correct position;

(S230) Start magnetic sector data write/read test. FIG. 1 The control unit 10 sends test data to the first write/read data processing unit 301 and the second write/read data processing unit 302, the third write/read data processing unit 303, and the fourth write/read data processing unit 302. Read data processing unit 304, first write/read data processing unit 301 and second write/read data processing unit 302, third write/read data processing unit 303, and fourth write/read The data processing unit 304 and the CRC data are respectively written into the outer ring of the first side of the first hard disk through the first read-write head 601 and the second read-write head 602, the third read-write head 603, and the fourth read-write head 604 Sector 801, first inner ring sector 802, second outer ring sector 803, second inner ring sector 804, and first read/write head 601, second read/write head 602, and third read/write head 603. The fourth read/write head 604 reads from the first side outer ring sector 801, the first side inner ring sector 802, the second side outer ring sector 803, and the second side inner ring sector 804 of the first hard disk. Return the data and compare whether the written data is consistent with the read data. Commonly used test data include AAh, 55h, 00h, FFh and random numbers;

(S240) Bad sector? If the data read is the same as the data write, the sector is a usable sector, and skip to step (S260); if the data read is different from the data write or the CRC cannot be detected and corrected, it is a bad sector. The drive manufacturer usually conducts 3~6 retests, and when it is determined that the sector cannot be used (recovery), skip to step (S250);

(S250) Mark the sector as bad (NG), skip back to (S260) to continue the next sector test; because the first read/ write head 601, the second read/write head 602, the third read/write head 603, and the fourth read The write head 604 simultaneously tests one of the first hard disk's first outer ring sector 801, the first inner ring sector 802, the second outer ring sector 803, and the fourth inner ring sector 804. When the write and read test failures are marked as "bad", there are several possible conditions:

(1) Only one of 801, 802, 803 and 804 is defective;

(2) At least one of 801, 802, 803 and 804 is defective;

(S260) Last sector? If it is the last sector, skip to (S280) for the next track test, otherwise skip to (S270).

(S270) sector+1, continue to execute the next magnetic sector write and read back test, skip to (S230).

(S280) Last track? If it is the last track, skip to (S295), otherwise skip to (S290) track=track+1

(S290) Track=Track+1, continue writing and reading test of the next track (S295) Reorder the sector numbers and generate P-List After the control unit completes the low-level formatting, each track must have a sector status table to record the final test result of each sector on the track. Step S295 is to compare the first hard disk under the same track. The sector status table for each track of the outer ring sector 801, the first inner ring sector 802, the second outer ring sector 803, and the second inner ring sector 804 and the available sectors are reordered.

In one embodiment, Table 2 to Table 5 are the 100th track magnetic zone status table of the first hard disk after low-level formatting, where Table 2 is the outer magnetic zone on the first side, and Table 3 is the inner magnetic zone on the first side. Table 4 is the outer region on the second side, and Table 5 is the state table of the inner region on the second side. In one embodiment, Table 6 to Table 9 are the 100th track magnetic zone status table of the first hard disk after low-level formatting, where Table 6 is the outer magnetic zone on the first side, and Table 7 is the inner magnetic zone on the first side. Table 8 is the outer region on the second side and Table 9 is the state table of the inner region on the second side. The description is as follows:

(1) Assuming that the total number of magnetic regions for each track is 64, the ordering is from the number of magnetic regions 00 to the number of magnetic regions 63, and the total number of reserved magnetic regions is 8 magnetic regions.

(2) After the low-level formatting is completed, the status table of the first hard disk with track number of 100 sectors is shown in Table 2 to Table 5: Table 2 explains: the first outer ring sector, After completing the low-level formatting, there is no bad sector status table, where S-00 is the first sector, S-63 is the 64th sector, and R-00~R-07 are reserved (replacement) Sector; Table 3 description: the first inner ring sector, complete low-level formatting, of which S-03 is a bad sector; Table 4 description: the second outer ring sector completes low-level format The S-59 sector is a bad sector; Table 5 explains: the second inner ring sector has completed low-level formatting, and the S-03 and S-16 sectors are bad sectors.

TABLE 2

The first hard disk first outer ring region, the number of tracks is 100

| S-00 | S-01 | S-02 | S-03 | S-04 | S-05 | S-06 | S-07 |
| S-08 | S-09 | S-10 | S-11 | S-12 | S-13 | S-14 | S-15 |

TABLE 2-continued

The first hard disk first outer ring region, the number of tracks is 100

| | | | | | | | |
|---|---|---|---|---|---|---|---|
| S-16 | S-17 | S-18 | S-19 | S-20 | S-21 | S-22 | S-23 |
| S-24 | S-25 | S-26 | S-27 | S-28 | S-29 | S-30 | S-31 |
| S-32 | S-33 | S-34 | S-35 | S-36 | S-37 | S-38 | S-39 |
| S-40 | S-41 | S-42 | S-43 | S-44 | S-45 | S-46 | S-47 |
| S-48 | S-49 | S-50 | S-51 | S-52 | S-53 | S-54 | S-55 |
| S-56 | S-57 | S-58 | S-59 | S-60 | S-61 | S-62 | S-63 |
| R-00 | R-01 | R-02 | R-03 | R-04 | R-05 | R-06 | R-07 |

In Table 2: The region on the first side of the first hard disk, the number of tracks is 100, and the region status table without any bad regions after low-level formatting. Among them, S-00 is the first sector and S-63 is the first 64 sectors, R-00~R-07 are reserved (replacement) sectors.

TABLE 3

The first hard disk first side inner circle region, the number of tracks is 100

| | | | | | | | |
|---|---|---|---|---|---|---|---|
| S-00 | S-01 | S-02 | S-03 NG | S-04 | S-05 | S-06 | S-07 |
| S-08 | S-09 | S-10 | S-11 | S-12 | S-13 | S-14 | S-15 |
| S-16 | S-17 | S-18 | S-19 | S-20 | S-21 | S-22 | S-23 |
| S-24 | S-25 | S-26 | S-27 | S-28 | S-29 | S-30 | S-31 |
| S-32 | S-33 | S-34 | S-35 | S-36 | S-37 | S-38 | S-39 |
| S-40 | S-41 | S-42 | S-43 | S-44 | S-45 | S-46 | S-47 |
| S-48 | S-49 | S-50 | S-51 | S-52 | S-53 | S-54 | S-55 |
| S-56 | S-57 | S-58 | S-59 | S-60 | S-61 | S-62 | S-63 |
| R-00 | R-01 | R-02 | R-03 | R-04 | R-05 | R-06 | R-07 |

In Table 3: The first hard disk has the inner circle sector on the first side, the number of tracks is 100, and the low-level format is completed. The S-03 sector is a bad sector.

TABLE 4

The outer region on the second side of the first hard disk, the number of tracks is 100

| | | | | | | | |
|---|---|---|---|---|---|---|---|
| S-00 | S-01 | S-02 | S-03 | S-04 | S-05 | S-06 | S-07 |
| S-08 | S-09 | S-10 | S-11 | S-12 | S-13 | S-14 | S-15 |
| S-16 | S-17 | S-18 | S-19 | S-20 | S-21 | S-22 | S-23 |
| S-24 | S-25 | S-26 | S-27 | S-28 | S-29 | S-30 | S-31 |
| S-32 | S-33 | S-34 | S-35 | S-36 | S-37 | S-38 | S-39 |
| S-40 | S-41 | S-42 | S-43 | S-44 | S-45 | S-46 | S-47 |
| S-48 | S-49 | S-50 | S-51 | S-52 | S-53 | S-54 | S-55 |
| S-56 | S-57 | S-58 | S-59 NG | S-60 | S-61 | S-62 | S-63 |
| R-00 | R-01 | R-02 | R-03 | R-04 | R-05 | R-06 | R-07 |

In Table 4: The outer magnetic zone on the second side of the first hard disk, the number of tracks is 100, and the low-level formatting is completed. The S-59 zone is a bad zone

TABLE 5

The inner circle of the second side of the first hard disk, the number of tracks is 100

| | | | | | | | |
|---|---|---|---|---|---|---|---|
| S-00 | S-01 | S-02 | S-03 NG | S-04 | S-05 | S-06 | S-07 |
| S-08 | S-09 | S-10 | S-11 | S-12 | S-13 | S-14 | S-15 |
| S-16 NG | S-17 | S-18 | S-19 | S-20 | S-21 | S-22 | S-23 |
| S-24 | S-25 | S-26 | S-27 | S-28 | S-29 | S-30 | S-31 |
| S-32 | S-33 | S-34 | S-35 | S-36 | S-37 | S-38 | S-39 |
| S-40 | S-41 | S-42 | S-43 | S-44 | S-45 | S-46 | S-47 |
| S-48 | S-49 | S-50 | S-51 | S-52 | S-53 | S-54 | S-55 |
| S-56 | S-57 | S-58 | S-59 | S-60 | S-61 | S-62 | S-63 |
| R-00 | R-01 | R-02 | R-03 | R-04 | R-05 | R-06 | R-07 |

In Table 5: The inner circle sector on the second side of the first hard disk, the number of tracks is 100, and the low-level formatting is completed. The S-03 and S-16 sectors are bad sectors.

(3) After performing step S295 to reorder the serial numbers of the magnetic regions, Table 6 explains: the outer magnetic regions on the first side, all the original magnetic regions are available, but in order to achieve the need of synchronous access, therefore: (1) magnetic region S-03 is marked as X-03 NU; the original magnetic region S-16 is marked as X16 NU; the original magnetic region S-59 is marked as X-59 NU, (NU means not used); (2) In addition to the above 3 magnetic region modification marks, reordering marks for all other sectors;

TABLE 6

The first hard disk first outer ring region, the number of tracks is 100

| | | | | | | | |
|---|---|---|---|---|---|---|---|
| S-00 | S-01 | S-02 | X-03 NU | S-03 | S-04 | S-05 | S-06 |
| S-07 | S-08 | S-09 | S-10 | S-11 | S-12 | S-13 | S-14 |
| X-16 NU | S-15 | S-16 | S-17 | S-18 | S-19 | S-20 | S-21 |
| S-22 | S-23 | S-24 | S-25 | S-26 | S-27 | S-28 | S-29 |
| S-30 | S-31 | S-32 | S-33 | S-34 | S-35 | S-36 | S-37 |
| S-38 | S-39 | S-40 | S-41 | S-42 | S-43 | S-44 | S-45 |
| S-46 | S-47 | S-48 | S-49 | S-50 | S-51 | S-52 | S-53 |
| S-54 | S-55 | S-56 | X-59 NU | S-57 | S-58 | S-59 | S-60 |
| S61- | S-62 | S-63 | R-00 | R-01 | R-02 | R-03 | R-04 |

In Table 6: All the original regions are available, but in order to achieve the need of synchronous access, so the serial number of the original region S-03 is marked as X-03 NU; the original S-16 is marked as X16 NU; the original S-59 is marked as X-59 NU, except for the above 3 sector modification marks, all other sectors are reordered.

(4) After performing step S295 to reorder the serial numbers of the sectors, Table 7 explains: the first outer magnetic sector, only S-03 of the original sectors is bad sector, but in order to achieve the need of synchronous access, so: ① The serial number of the original sector S-16 is marked as X-16 NU; the original S-59 is marked as X-59 NU; the original S-03 remains marked as X-03 NG. In addition to the above 3 sector modification marks, all others Sector reordering marks.

TABLE 7

The first hard disk first side inner circle region, the number of tracks is 100

| | | | | | | | |
|---|---|---|---|---|---|---|---|
| S-00 | S-01 | S-02 | X-03 NG | S-03 | S-04 | S-05 | S-06 |
| S-07 | S-08 | S-09 | S-10 | S-11 | S-12 | S-13 | S-14 |
| X-16 NU | S-15 | S-16 | S-17 | S-18 | S-19 | S-20 | S-21 |
| S-22 | S-23 | S-24 | S-25 | S-26 | S-27 | S-28 | S-29 |
| S-30 | S-31 | S-32 | S-33 | S-34 | S-35 | S-36 | S-37 |
| S-38 | S-39 | S-40 | S-41 | S-42 | S-43 | S-44 | S-45 |

TABLE 7-continued

The first hard disk first side inner circle region, the number of tracks is 100

| S-46 | S-47 | S-48 | S-49 | S-50 | S-51 | S-52 | S-53 |
|------|------|------|------|------|------|------|------|
| S-54 | S-55 | S-56 | X-59 NU | S-57 | S-58 | S-59 | S-60 |
| S61- | S-62 | S-63 | R-00 | R-01 | R-02 | R-03 | R-04 |

In Table 7 Only S-03 is the bad region, but in order to achieve the need of synchronous access, therefore:

1) The serial number of the original region S-16 is marked as X-16 NU; the original S-59 is marked as X-59 NU; the original S-03 remains marked as X-03 NG 2) Except for the above 3 sector modification marks, all other sectors are reordered.

(5) Step S295 After re-ordering the serial numbers of the sectors, Table 8 explains: the first outer magnetic sector, only S-59 of the original magnetic sector is bad sector, but in order to achieve the need of synchronous access, so ① The original magnetic sector number S-03 is marked as X-03 NU; the original S-16 is marked as X16 NU; the original S-59 remains marked as X-59 NG. ② Except for the above 3 magnetic sector modification marks, all other sectors are renew Sort mark.

TABLE 8

The outer region on the second side of the first hard disk, the number of tracks is 100

| S-00 | S-01 | S-02 | X-03 NU | S-03 | S-04 | S-05 | S-06 |
|------|------|------|---------|------|------|------|------|
| S-07 | S-08 | S-09 | S-10 | S-11 | S-12 | S-13 | S-14 |
| X-16 NU | S-15 | S-16 | S-17 | S-18 | S-19 | S-20 | S-21 |
| S-22 | S-23 | S-24 | S-25 | S-26 | S-27 | S-28 | S-29 |
| S-30 | S-31 | S-32 | S-33 | S-34 | S-35 | S-36 | S-37 |
| S-38 | S-39 | S-40 | S-41 | S-42 | S-43 | S-44 | S-45 |
| S-46 | S-47 | S-48 | S-49 | S-50 | S-51 | S-52 | S-53 |
| S-54 | S-55 | S-56 | X-59 NG | S-57 | S-58 | S-59 | S-60 |
| S61- | S-62 | S-63 | R-00 | R-01 | R-02 | R-03 | R-04 |

In Table 8 Only S-59 is bad magnetic area, but in order to achieve the need of synchronous access, (1) The serial number of the original magnetic area S-03 is marked as X-03 NU; the original S-16 is marked as X16 NU; the original S-59 remains marked as X-59 NG.

(2) Except for the above 3 sector modification marks, all other sectors are reordered.

(6) Step S295 After the reordering of the sector numbers, Table 9 explains: the second side inner ring sector, the sector number reordering status table, all the original sectors only S-03 and S-16 are bad sectors, But in order to achieve the need for synchronous access, ① The original sector number S-03 remains marked as X-03 NG; the original S-16 remains marked as X-16 NG; the original S-59 is marked as X-59 NU CU ② Except for the above 3 magnetic zone modification marks, all other magnetic zones are reordered.

TABLE 9

The inner circle of the second side of the first hard disk, the number of tracks is 100

| S-00 | S-01 | S-02 | X-03 NG | S-03 | S-04 | S-05 | S-06 |
|------|------|------|---------|------|------|------|------|
| S-07 | S-08 | S-09 | S-10 | S-11 | S-12 | S-13 | S-14 |
| X-16 NG | S-15 | S-16 | S-17 | S-18 | S-19 | S-20 | S-21 |
| S-22 | S-23 | S-24 | S-25 | S-26 | S-27 | S-28 | S-29 |
| S-30 | S-31 | S-32 | S-33 | S-34 | S-35 | S-36 | S-37 |
| S-38 | S-39 | S-40 | S-41 | S-42 | S-43 | S-44 | S-45 |
| S-46 | S-47 | S-48 | S-49 | S-50 | S-51 | S-52 | S-53 |
| S-54 | S-55 | S-56 | X-59 NU | S-57 | S-58 | S-59 | S-60 |
| S61- | S-62 | S-63 | R-00 | R-01 | R-02 | R-03 | R-04 |

In Table 9 On the second side of the inner circle region, the region serial number is reordered. Only S-03 and S-16 are bad regions, but in order to achieve the need of synchronous access, (1) The original region serial number S-03 remains marked as X-03 NG; the original S-16 remains marked as X-16 NG; the original S-59 is marked as X-59 NU.

(2) Except for the above 3 sector modification marks, all other sectors are reordered.

Conclusion: After reordering the original magnetic field state table according to the above-mentioned embodiment, the magnetic field state table can reach the first read-write head, the second read-write head, and the third read-write head no matter which region or track it is in. Each of the sectors accessed by the write head and the fourth read/write head is available and has the same number of sectors (sequence). We call this sector-access synchronization (Sector-Access Synchronize), in other words 4 read-write heads can simultaneously access the same sequence and the same number of sectors data, thus achieving 4 times the access performance. Integrating the sector status table of each track becomes the P-List of the hard drive. It is not necessary to implement the synchronization of sector access. Even if it is not implemented, the four read-write heads can complete the access to the sector data individually, even if it is not implemented. Within the scope of patent power.

The data transmission rate, according to FIG. 1 and the above-mentioned embodiments, in this case, one hard disk must be equipped with 2 read-write heads, 12 hard disks must be equipped with 24 read-write heads, and 24 read-write heads must be coupled to write separately/Read data processing unit group 30 has 24 write/read data processing units, so when 24 read-write heads simultaneously access hard disk data at the same time, it is 24 times the data transfer rate; also, see page 2—As shown in FIG. 1, in this case, one hard disk must be equipped with 4 read-write heads, 12 hard disks must be equipped with 48 read-write heads, and 48 read-write heads must be coupled to 48 write/read data processing units. When 48 read-write heads access the hard disk data synchronously, it is 48 times the data transfer rate; also, see FIG. 2C. In this case, one hard disk must be equipped with 6 read-write heads and 12 hard disks. 72 read/write heads, 72 read/write heads have to be coupled to 72 write/read data processing units, so when 72 read/write heads access hard disk data synchronously, it is 72 times the data transfer rate, and the so-called double speed. The data transfer rate is about 150 MB/s to 200 MB/s, and the 24× speed is about 7200 MB/s to 9600 MB/s, which basically meets the PCI-e 6.0 transmission specification of 7877 MB/s (actually 7755 MB/s), while the 48× speed And 72× speed can meet the requirements of the future generation of transmission interface and transmission specifications. Furthermore, this case includes two sets of transmission interfaces 20, two sets of control units 10, two sets of write/read data processing units 30, two sets of permanent magnet combinations 50, two sets of drive arms and read/write head combination units 60, Two sets of rotating shaft motors 70, two sets of hard disk sets 80, etc., in other words, with 6 read-write heads on one hard disk, and a total of 144 read-write heads are simultaneously accessed, the above-mentioned data transfer rate further reaches the traditional hard disk 144 times the machine. The data transmission speed of the hard disk drive is related to the rotation speed of the spindle motor and the access time from the read/write head to the magnetic track. Today, the data transmission speed of the 2.5" hard drive is about 150 MB/s to 200 MB/s. With the original hard disk drive shaft motor speed and read/write head access time unchanged, after implementing this patented technology, a single disk hard disk drive can reach data transfer speeds of 900 MB/s to 1200 MB/s, which is higher than that of SATA 3.0 Transmission speed: The hard disk drive with dual discs can reach a data transmission speed of 1,800 MB/s~2,400 MB/s, which is about three times the data transmission speed of SATA 3.0.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A storage device comprising a drive arm having at least two of read-write heads capable of accessing data synchronously, the storage device comprising:
   at least one hard disk, wherein each hard disk is divided into at least two regions;
   a drive arm, having at least two read-write heads, wherein each read-write head reads and writes data in a corresponding region of the at least two regions to increase the speed of accessing data by at least two times faster; and
   a control unit, separating first data to be written into a plurality of write-data, wherein each write-data corresponds to a different read-write head of the at least two read-write heads, wherein each of the at least two read-write heads is associated with a separate process unit, respectively, wherein each of said processing units comprises a separate series/parallel data converter for writing said first data into said at least two regions synchronously.

2. The storage device according to claim 1, wherein the storage device has an interface unit, wherein the interface unit is one of the following: Parallel ATA series, Serial ATA series, SCSI series, USB series, SAS series and PCIe series.

3. The storage device according to claim 1, wherein each of said processing units further comprises at least one of the following: a data buffer, a CRC generator, error data detection and calibrator, and a comparator of magnetic track number and sector number.

4. The storage device according to claim 1, wherein each write-data is respectively associated with a separate CRC (cyclic redundancy check) of the write-data, wherein each separate CRC is written into its corresponding region of the at least two regions by its corresponding read-write head, respectively.

5. The storage device according to claim 3, wherein the control unit further integrates the processing unit to become a multi-core control unit or a multi-core CPU unit.

6. The storage device according to claim 1, wherein the drive arm has four read-write heads, wherein each hard disk is divided into four regions, and the hard disk is in the state after it is formatted, wherein a rule for reordering serial numbers of the sectors are: under the same track, if a track in one of the regions is bad, a track in one of the regions is marked as not usable if said track is bad for all of said four read-write heads.

7. The storage device as described in claim 1, wherein the storage device has a configuration setting switch to change speeds of accessing data in one of the following conditions: 8× speed be changed to 4× speed with four read-write heads accessing data synchronously for a hard disk, 2 single-side hard disks with four read-write heads accessing data synchronously; 6× speed be changed to 3× with three read-write heads accessing data synchronously, and 2× speed with two read-write heads accessing data synchronously for a hard disk.

8. The storage device according to claim 1, wherein two read-write heads are arranged on each side of a hard disk, wherein four read-write heads access the hard disk synchronously.

9. The storage device according to claim 1, wherein three read-write heads are arranged on each side of a hard disk, wherein six read-write heads access the hard disk synchronously.

10. A storage device comprising a drive arm having at least two read-write heads capable of accessing data synchronously, the storage device comprising:
    at least one hard disk, wherein each hard disk is divided into at least two regions;
    a drive arm, having at least two read-write heads, wherein each read-write head reads and writes data in a corresponding region of the at least two regions; and
    a control unit, separating first data to be written into a plurality of write-data, wherein each write-data corresponds to a different read-write head of the at least two read-write heads for writing said first data synchronously, wherein the drive arm has four read-write heads, wherein each hard disk is divided into four regions, and the hard disk is in the state after it is formatted, wherein a rule for reordering serial numbers of the sectors are: under the same track, if a track in one of the regions is bad, a track in one of the regions is marked as not usable if said track is bad for all of said four read-write heads.

11. A storage device comprising a drive arm having at least two read-write heads capable of accessing data synchronously, the storage device comprising:
    at least one hard disk, wherein each hard disk is divided into at least two regions;
    a drive arm, having at least two read-write heads, wherein each read-write head reads and writes data in a corresponding region of the at least two regions; and
    a control unit, separating first data to be written into a plurality of write-data, wherein each write-data corresponds to a different read-write head of the at least two read-write heads for writing said first data synchronously, wherein the storage device has a configuration setting switch to change speeds of accessing data in one of the following conditions: 8× speed be changed to 4× speed with four read-write heads accessing data synchronously for a hard disk, 2 single-side hard disks with four read-write heads accessing data synchronously; 6× speed be changed to 3× with three read-write heads accessing data synchronously, and 2× speed with two read-write heads accessing data synchronously for a hard disk.

* * * * *